(12) United States Patent
Ryan

(10) Patent No.: US 12,047,210 B2
(45) Date of Patent: Jul. 23, 2024

(54) DEMODULATING FREQUENCY-MODULATED SIGNALS

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 29 days.

(21) Appl. No.: 18/010,413

(22) PCT Filed: Jun. 16, 2021

(86) PCT No.: PCT/EP2021/066269
§ 371 (c)(1),
(2) Date: Dec. 14, 2022

(87) PCT Pub. No.: WO2021/255108
PCT Pub. Date: Dec. 23, 2021

(65) Prior Publication Data
US 2023/0283504 A1 Sep. 7, 2023

(30) Foreign Application Priority Data

Jun. 16, 2020 (GB) ..................... 2009141

(51) Int. Cl.
*H04L 27/156* (2006.01)
(52) U.S. Cl.
CPC .................. *H04L 27/156* (2013.01)
(58) Field of Classification Search
CPC ....... H04L 27/32; H04L 27/063; H04L 27/10; H04L 27/103; H04L 27/106; H04L 27/14; H04L 27/144; H04L 27/156
See application file for complete search history.

(56) References Cited

U.S. PATENT DOCUMENTS

| 5,930,243 A | 7/1999 | Parish et al. |
| 11,611,460 B2 * | 3/2023 | Nowshadi ........... H04L 27/0014 |

(Continued)

FOREIGN PATENT DOCUMENTS

| WO | WO 2014/167318 A2 | 10/2014 |
| WO | WO 2017/103557 A1 | 6/2017 |

(Continued)

OTHER PUBLICATIONS

Bianchi et al., "On the Blind Estimation of the Parameters of Continuous Phase Modulated Signals," *IEEE Journal on Selected Areas in Communications*, vol. 23, No. 5, May 2005, pp. 944-962.

(Continued)

*Primary Examiner* — Freshteh N Aghdam
(74) *Attorney, Agent, or Firm* — Klarquist Sparkman, LLP

(57) ABSTRACT

A method of, and apparatus for, demodulating a frequency-modulated signal. The method comprises: for each of a plurality of templates, performing a respective cross-correlation operation between the template and data representative of the frequency-modulated signal, each template comprising data representative of a signal that is frequency-modulated with predetermined preamble data using a different respective modulation index; generating frequency-offset data from one or more of the cross-correlation operations, the frequency-offset data being representative of a difference between a reference frequency and a carrier frequency of the frequency-modulated signal; determining a respective peak correlation-coefficient value from each of the cross-correlation operations; identifying a highest peak correlation-coefficient value in the determined peak correlation-coefficient values; determining a modulation index estimate in dependence on which template produced the highest peak correlation-coefficient value; and using the (Continued)

frequency-offset data and the modulation index estimate to demodulate at least a portion of the frequency-modulated signal.

20 Claims, 5 Drawing Sheets

(56) References Cited

U.S. PATENT DOCUMENTS

| | | | |
|---|---|---|---|
| 2003/0043947 A1* | 3/2003 | Zehavi | H04B 1/7156 375/334 |
| 2009/0323867 A1* | 12/2009 | Rasmussen | H04L 7/042 375/343 |
| 2017/0234985 A1 | 8/2017 | Kadambi et al. | |
| 2017/0329743 A1 | 11/2017 | Kim et al. | |
| 2018/0048406 A1* | 2/2018 | Kikuzuki | H04L 7/046 |

FOREIGN PATENT DOCUMENTS

| | | |
|---|---|---|
| WO | WO 2019/134947 A2 | 7/2019 |
| WO | WO 2019/207009 A1 | 10/2019 |
| WO | WO 2021/255124 A1 | 12/2021 |

OTHER PUBLICATIONS

Conway et al., "Fast Quantizing and Decoding Algorithms for Lattice Quantizers and Codes," *IEEE Transaction on Information Theory*, vol. IT-28, No. 2, Mar. 1982, pp. 227-232.
Damen et al., "On Maximum Likelihood Detection and the Search for the Closest Lattice Point," *IEEE Transactions on Information Theory*, vol. 49, No. X, 2003, 13 pages.
International Search Report and Written Opinion for PCT/EP2021/066269, mailed Aug. 18, 2021, 13 pages.
International Search Report and Written Opinion for PCT/EP2021/066302, mailed Aug. 18, 2021, 13 pages.
IPO Search Report under Section 17(5) for GB2009141.9, mailed Mar. 3, 2021, 3 pages.
IPO Search Report under Section 17(5) for GB2009149.2, mailed Mar. 5, 2021, 3 pages.
Jain, "Noncoherent Sequence Detection Receiver for Bluetooth Systems," *Thesis*, Sep. 2004, 116 pages.
Kay, "A Fast and Accurate Single Frequency Estimator," *IEEE Transactions on Acoustics, Speech, and Signal Processing*, vol. 37, No. 12, Dec. 1989, pp. 1987-1990.
McKilliam et al., "A linear-time nearest point algorithm for the lattice An," *2008 International Symposium on Information Theory and its Applications*, Dec. 2008, pp. 1-5.
McKilliam et al., "An Algorithm to Compute the Nearest Point in the Lattice An," *IEEE Transactions on Information Theory*, vol. 54, No. 9, Sep. 2008, pp. 4378-4381, arXiv:0801.1364 [cs.IT].
McKilliam et al., "Frequency Estimation by Phase Unwrapping," *IEEE Transactions on Signal Processing*, vol. 58, No. 6, Jun. 2010, pp. 2953-2963.
Meyr et al., "Digital Communication Receivers—Synchronization, Channel Estimation, and Signal Processing," *John Wiley & Sons, Inc.*, 1998, pp. 478-490.
Tibenderana et al., "Efficient and Robust Detection of GFSK Signals under Dispersive Channel, Modulation Index, and Carrier Frequency Offset Conditions," *EURASIP Journal on Applied Signal Processing*, 2005, pp. 2719-2729.
Vaughan et al., "An Algorithm to Compute a nearest Point in the Lattice An," In: Fossorier, M., Imai, H., Lin, S., Poli, A. (eds) Applied Algebra, Algebraic Algorithms and Error-Correcting Codes. AAECC 1999. *Lecture Notes in Computer Science*, vol. 1719. Springer, Berlin, Heidelberg, pp. 104-108.
Xu et al., "Robust phase unwrapping algorithm," *Electronics Letters*, vol. 49, No. 24, Nov. 1, 2013, pp. 1565-1567.

\* cited by examiner

DEMODULATING FREQUENCY-MODULATED SIGNALS

CROSS REFERENCE TO RELATED APPLICATIONS

This is the U.S. National Stage of International Application No. PCT/EP2021/066269, filed Jun. 16, 2021, which was published in English under PCT Article 21(2), which in turn claims the benefit of Great Britain Application No. 2009141.9, filed Jun. 16, 2020.

BACKGROUND OF THE INVENTION

This invention relates to methods and apparatus for demodulating frequency-modulated signals.

Various radio communication systems are known for transmitting binary message data by encoding data on a frequency-modulated carrier signal. Examples include Bluetooth™ and Bluetooth Low Energy (BLE)™. These both use Gaussian FSK (GFSK) modulation. In binary frequency-shift key (FSK) modulation, data is encoded by the transmitter transmitting one of two different frequencies, offset either side of a carrier frequency. The modulation may be applied so that the phase of the transmitted signal is continuous using continuous-phase FSK (CP-FSK). GFSK is a type of CP-FSK in which spectral leakage is reduced by Gaussian shaping of the modulating data signal.

The modulation index, h, used by the radio transmitter is the difference between the two FSK frequencies, divided by the bitrate of the encoded data stream. The BLE specification allows the transmitter's modulation index to be within a range of values, $h \in [0.45, 0.55]$. This tolerance can result in poor demodulation accuracy in BLE receivers. Receivers supporting other radio protocols that use frequency modulation can also suffer from this problem.

It is known for a receiver to try to estimate the modulation index used by the transmitter, and apply compensation, in order to mitigate this problem. For example, the thesis "Noncoherent Sequence Detection Receiver for Bluetooth Systems" by Mani Jain, published by The University of British Columbia, September 2004, proposes estimating the modulation index, h, by performing non-coherent sequence detection for a small number of hypotheses, h, over an estimation period, and choosing the hypothesis that yields the best metric, over the estimation period, as an estimated modulation index h. A respective estimate h is determined for each packet, whenever a new packet arrives. Jain states that, if frequency offset cancellation is employed, even just two hypotheses h can yield good results, because any residual frequency drift due to a mismatched estimate h can be alleviated by applying a frequency offset estimation method.

However, the present applicant has recognised that such an approach does not necessarily work effectively in the presence of large frequency offsets—e.g. where there is a significant mismatch between an oscillator in the transmitter and an oscillator in the receiver. The present invention provides an alternative approach.

SUMMARY OF THE INVENTION

From a first aspect, the invention provides a method of demodulating a frequency-modulated signal, the method comprising:

for each of a plurality of templates, performing a respective cross-correlation operation between the template and data representative of the frequency-modulated signal, wherein each template comprises data representative of a signal that is frequency-modulated with predetermined preamble data using a different respective modulation index;

generating frequency-offset data from one or more of the cross-correlation operations, the frequency-offset data being representative of a difference between a reference frequency and a carrier frequency of the frequency-modulated signal;

determining a respective peak correlation-coefficient value from each of the cross-correlation operations;

identifying a highest peak correlation-coefficient value in the determined peak correlation-coefficient values;

determining a modulation index estimate in dependence on which template produced the highest peak correlation-coefficient value; and using the frequency-offset data and the modulation index estimate to demodulate at least a portion of the frequency-modulated signal.

From a second aspect, the invention provides an apparatus for demodulating a frequency-modulated signal, the apparatus comprising:

a preamble correlator; and
a signal demodulator, wherein the preamble correlator is configured to:

perform, for each of a plurality of templates, a respective cross-correlation operation between the template and data representative of the frequency-modulated signal, wherein each template comprises data representative of a signal that is frequency-modulated with predetermined preamble data using a different respective modulation index;

generate frequency-offset data from one or more of the cross-correlation operations, the frequency-offset data being representative of a difference between a reference frequency and a carrier frequency of the frequency-modulated signal;

determine a respective peak correlation-coefficient value from each of the cross-correlation operations;

identify a highest peak correlation-coefficient value in the determined peak correlation-coefficient values; and determine a modulation index estimate in dependence on which template produced the highest peak correlation-coefficient value, and wherein the signal demodulator is configured to:

use the frequency-offset data and the modulation index estimate to demodulate at least a portion of the frequency-modulated signal.

Thus it will be seen that, in accordance with the invention, the modulation index and the frequency offset are both estimated using the same cross-correlation operations, against a known preamble sequence, rather than being estimated separately. This is efficient and can allow both values to be estimated quickly upon receiving the signal—e.g. before a message portion of the signal is demodulated. It also enables the modulation index to be estimated accurately even in the presence of significant frequency offset, since the cross-correlation operation does not assume any particular frequency offset, such as a zero frequency offset. Instead, the cross-correlation operation allows any frequency offset to be estimated as part of the operation.

In some embodiments, timing information may also be generated from one or more of the cross-correlation operations. This can provide further efficiency by allowing timing, frequency-offset and modulation-index information to be determined from the same set of cross-correlation operations. At least one of the cross-correlation operations may comprise a data-aided joint timing and frequency estimation operation. The timing information may comprise symbol (e.g. bit) synchronization information and/or frame synchronization information. The received signal may comprise (i.e. encode) the predetermined preamble data. The timing information may identify a position of the predetermined preamble data within the signal.

In some embodiments, a first cross-correlation operation between a first template and data representative of the frequency-modulated signal may be a sliding operation. It may comprise determining a respective correlation-coefficient value (e.g. by performing a dot product calculation) at each of a plurality of different time offsets between the first template and the signal data. This first cross-correlation operation may be used to determine timing information—e.g. to determine the position of the preamble data within the signal. It may also be used to determine the frequency-offset data, either alone or in conjunction with one or more further cross-correlation operations.

A second cross-correlation operation may be performed between a second template and data representative of the frequency-modulated signal, wherein the timing information determined using the first template may be used when performing the second cross-correlation operation. This may allow the second cross-correlation operation to be performed at a predetermined time offset between the second template and the signal data that depends on the timing information. The second operation may be performed only at this time offset—i.e. without any sliding. The second cross-correlation operation may comprise determining a respective correlation-coefficient value (e.g. by performing a dot product calculation) at a time offset, which may correspond to the position of the preamble data within the signal. One or more further cross-correlation operations, using one or more further templates, may, similarly, be applied only to the preamble data. This can reduce the complexity (e.g. physical size) of the preamble correlator.

In some embodiments, the first template may be generated during an initialisation process—e.g. while a radio receiver of the apparatus is starting up. It may be generated in hardware. The second or further templates may then be generated during the same initialisation process, or at least before a first valid peak is detected.

In one set of embodiments, some or all of the cross-correlation operations may be performed serially. In particular, the second and any further cross-correlation operations may be performed after the first cross-correlation operation is completed. The preamble correlator may be configured with a different template for each successive cross-correlation operation. A processor or direct memory access (DMA) circuitry may write data representing a respective template to a register interface of the preamble correlator for each respective cross-correlation operation—e.g. at the start of each cross-correlation operation.

In another set of embodiments, however, some or all of the cross-correlation operations may be performed in parallel. This may be quicker, especially if there are more than just two or three different templates, but it may require additional circuitry.

The data representative of the frequency-modulated signal may comprise a sequence of sample values, which may be complex values. It may be stored in a memory (e.g. RAM) or in registers. The samples may be at baseband. The apparatus may comprise an analogue-to-digital converter (ADC) for sampling the frequency-modulated signal. It may comprise an analogue or digital mixer for down-mixing the signal—e.g. to baseband.

The signal may be a received signal—e.g. being received by the apparatus from a separate transmitter apparatus, over a wired or wireless channel. Methods disclosed herein may comprise receiving the frequency-modulated signal. The received frequency-modulated signal may be a radio signal. The apparatus may be a receiver apparatus which may comprise a radio antenna for receiving the signal. The signal may be modulated around a carrier frequency, e.g. around 2.4 GHz. It may be a Bluetooth™ or BLE signal.

The apparatus may be or comprise a radio receiver or transceiver. The apparatus may comprise one or more of: an antenna; a low-noise amplifier; an ADC; a local oscillator; and a mixer. The apparatus may comprise a processor and a memory for storing software instructions for execution by the processor. The preamble correlator may be implemented wholly or partly in software, but in one set of embodiments it is a dedicated hardware circuit, distinct from the processor. Similarly, the signal demodulator may be at least partly implemented in software, but in one set of embodiments it is implemented as a dedicated hardware circuit.

The frequency-modulated signal may be a frequency-shift-key (FSK) modulated signal. It may be a binary-FSK signal. It may be a CP-FSK signal. It may be a GFSK signal. It may be modulated in amplitude as well as frequency—e.g., using quadrature amplitude modulation (QAM).

The signal may encode part or all of a data packet—e.g. a BLE baseband packet. The signal may comprise a preamble portion and a message-data portion. The preamble portion may be at or near the beginning of the signal. The preamble portion may encode the predetermined preamble data. The preamble data may comprise part or all of a predetermined synchronization sequence (e.g. part or all of a BLE Access Code or Sync Word). It may additionally or alternatively comprise part or all of a device or connection identifier, such as a receiver address field or a link-layer connection identifier.

Each template may comprise a sequence of complex coefficients. These complex values may be spaced in time to correspond to a sampling rate of the incoming signal (after any optional up-sampling). Each template may represent samples of its respective uniquely-modulated signal, optionally after a complex conjugate operation on each sample. The complex coefficients of the templates may represent signals at baseband. The templates may all encode the same predetermined preamble data. Since the preamble is predetermined, the templates may already be stored in a memory of the apparatus before the signal is received and/or processed.

Each cross-correlation operation may determine one or more correlation-coefficient values. Each correlation-coefficient value may depend on a vector dot product between a respective template and a respective portion of the data signal. Each correlation-coefficient value may be scaled—e.g. normalized in dependence on a measure of signal power for the respective portion of the data signal.

The cross-correlation operation may use a conventional single correlator metric, in which each correlation-coefficient value depends on a vector dot product between a template and a portion of the data signal having the same length (i.e. duration) as the template.

However, in one set of embodiments, at least for one of the cross-correlation operations (e.g. a sliding cross-correlation performed with a first template to determined timing information), each correlation-coefficient value depends on a portion of the data signal that is longer than the template (i.e. by one or more sample periods). Each correlation-coefficient value may depend on a dot product between the template and a respective sequence of values derived from the signal, wherein each value depends on, or equals, the product (or the complex conjugate of the product) of a respective first sample from the signal and the complex conjugate of a respective second sample from the signal. Each second sample may be offset from the respective first sample by an offset period—e.g. by two symbol periods. The offset period may be the same for every correlation-coefficient value. By performing such a "double" correlation, the presence of any non-zero frequency offset in the baseband samples (e.g. due to mismatched oscillators, or due to Doppler shift) need not reduce the accuracy of the sliding cross-correlation operation for determining the location of a peak, since it only scales all correlation coefficients by a common factor.

The plurality of templates may be two, three or more templates. In some embodiments, using just two templates has been found to give a very substantial improvement in demodulation sensitivity. In general, more templates may yield a more accurate estimate of the modulation index, but may require more complex correlator circuitry and/or introduce a greater delay in determining the estimate.

In some embodiments, a first template signal may be modulated using a modulation index of around 0.5, while a second template signal may be modulated using a modulation index of less than 0.5, such as around 0.45 or less. Such embodiments may be useful when demodulating BLE signals.

The frequency-offset data may be generated by determining the argument of a correlation-coefficient value (e.g. a vector dot product) from one or more of the cross-correlation operations. The frequency difference may equal this argument, scaled by a scaling factor which may depend on the duration of the template. The reference frequency may be a mixing frequency of the apparatus—e.g. a frequency generated by one or more analog or digital local oscillators in the apparatus. The reference frequency may be a carrier frequency of the signal.

Determining a respective peak correlation-coefficient value from each of the cross-correlation operations may be trivial for any cross-correlation operation that does not need to slide the template in time. For a first cross-correlation operation that generates a time sequence of correlation-coefficient values, any suitable peak-finding algorithm may be used; e.g. by comparing a stream of correlation-coefficient values against a threshold and detecting a peak whenever the threshold is exceeded.

Identifying a highest peak correlation-coefficient value in the determined peak correlation-coefficient values may comprise a comparison operation of the peak values from across the templates.

In some embodiments, the modulation index estimate is always set equal to the modulation index used to generate the template that produced the highest peak correlation-coefficient value (referred to hereafter as the best-matched template). However, in other embodiments, the modulation index estimate may, for at least a set of one or more of the templates, be different from the modulation index of the best-matched template when the best-matched template is in said set (e.g. by 1%, 5% or 10% or more). It may nevertheless always be closer to the modulation index of the best-matched template than it is to the modulation index of any other template of the plurality of templates.

In some embodiments, if the modulation index of the best-matched template is the smallest index in the set of modulation indices used by the plurality of templates, the modulation index estimate may be set greater than said smallest index (e.g. by 1%, 5% or 10% or more). Similarly, in some embodiments, if the modulation index of the best-matched template is the largest index in the set of modulation indices used by the plurality of templates, the modulation index estimate may be set smaller than said largest index (e.g. by 1%, 5% or 10% or more). This may help to improve the performance of the demodulation in cases of estimation error, e.g. where the wrong template is identified as the best-matched template (e.g. due to channel noise). For example, in an embodiment in which the smallest modulation index used by the templates is 0.45, the modulation index estimate may be set at 0.475 when the best-matched template has the smallest modulation index of 0.45.

This idea may be used even in embodiments that do not necessarily generate frequency-offset data from the cross-correlation operations.

Thus, from a further aspect, the invention provides a method of demodulating a frequency-modulated signal, the method comprising:

for each of a plurality of templates, performing a respective cross-correlation operation between the template and data representative of the frequency-modulated signal, wherein each template comprises data representative of a signal that is frequency-modulated with predetermined preamble data using a different respective modulation index;

determining a respective peak correlation-coefficient value from each of the cross-correlation operations;

identifying a highest peak correlation-coefficient value in the determined peak correlation-coefficient values;

determining a modulation index estimate that is different from the modulation index of the template that produced the highest peak correlation-coefficient value; and using the modulation index estimate to demodulate at least a portion of the frequency-modulated signal.

From a second aspect, the invention provides an apparatus for demodulating a frequency-modulated signal, the apparatus comprising:

a preamble correlator; and a signal demodulator, wherein the preamble correlator is configured to:

perform, for each of a plurality of templates, a respective cross-correlation operation between the template and data representative of the frequency-modulated signal, wherein each template comprises data representative of a signal that is frequency-modulated with predetermined preamble data using a different respective modulation index;

determine a respective peak correlation-coefficient value from each of the cross-correlation operations;

identify a highest peak correlation-coefficient value in the determined peak correlation-coefficient values; and determine a modulation index estimate that, for at least a set of one or more of the templates, is different from the modulation index of the template that produced the highest peak correlation-coefficient value when the template that produced the highest peak correlation-coefficient value is in said set, and wherein the signal demodulator is configured to:

use the modulation index estimate to demodulate at least a portion of the frequency-modulated signal.

Embodiments of these aspects may include any features disclosed with reference to other aspects and embodiments herein, and vice versa.

In embodiments according to any aspect, the signal demodulator may comprise a matched filter bank (MFB) for demodulating at least a portion of the frequency-modulated signal—e.g. for demodulating a message-data portion. The MFB may be distinct from the preamble correlator. It may comprise a bank of correlators configured to cross-correlate some or all of the data representative of the frequency-modulated signal against respective filters. Each filter may be determined at least in part by a set of filter coefficients, which may be stored in registers of the signal demodulator. Data representative of the modulation index estimate may be output by the preamble correlator and may be used to control respective sets of filter coefficients used by the signal demodulator.

The signal demodulator may comprise a frequency-correction circuit which may be configured to apply a rotation operation to at least a portion of the data representative of the frequency-modulated signal. The frequency-correction circuit may comprise one or more CORDICs. The rotation may depend, at least in part, on the frequency-offset data, which the frequency-correction circuit may be arranged to receive from the preamble correlator. Rotated data output by the frequency-correction circuit may, in some embodiments, be received by the MFB.

The signal demodulator may comprise decision circuitry for demodulating the frequency-modulated signal. The decision circuitry may receive correlation-coefficient data from an MFB. It may comprise majority-vote logic, or any other appropriate demodulating and/or decoding logic.

The apparatus may comprise a memory for storing demodulated data. It may further process the demodulated data, e.g. to decode message data from a message-data portion. In some situations, the signal may control an operation of the apparatus, such as causing the apparatus to display information on a display screen, or control a peripheral.

In some embodiments, it may not be necessary to generate frequency-offset data from the cross-correlation operations. However, timing information may be determined from one or more of the cross-correlation operations, as already disclosed above.

Thus, from a further aspect, the invention provides a method of demodulating a frequency-modulated signal, the method comprising:
  for each of a plurality of templates, performing a respective cross-correlation operation between the template and data representative of the frequency-modulated signal, wherein each template comprises data representative of a signal that is frequency-modulated with predetermined preamble data using a different respective modulation index;
  generating timing information from one or more of the cross-correlation operations, the timing information comprising symbol-synchronization or frame-synchronization information;
  determining a respective peak correlation-coefficient value from each of the cross-correlation operations;
  identifying a highest peak correlation-coefficient value in the determined peak correlation-coefficient values;
  determining a modulation index estimate in dependence on which template produced the highest peak correlation-coefficient value; and
  using the timing information and the modulation index estimate to demodulate at least a portion of the frequency-modulated signal.

From a further aspect, the invention provides an apparatus for demodulating a frequency-modulated signal, the apparatus comprising:
  a preamble correlator; and
  a signal demodulator,
wherein the preamble correlator is configured to:
  perform, for each of a plurality of templates, a respective cross-correlation operation between the template and data representative of the frequency-modulated signal, wherein each template comprises data representative of a signal that is frequency-modulated with predetermined preamble data using a different respective modulation index;
  generate timing information from one or more of the cross-correlation operations, the timing information comprising symbol-synchronization or frame-synchronization information;
  determine a respective peak correlation-coefficient value from each of the cross-correlation operations;
  identify a highest peak correlation-coefficient value in the determined peak correlation-coefficient values; and
  determine a modulation index estimate in dependence on which template produced the highest peak correlation-coefficient value,
and wherein the signal demodulator is configured to:
  use the timing information and the modulation index estimate to demodulate at least a portion of the frequency-modulated signal.

Embodiments of these aspects may include any features disclosed with reference to other aspects and embodiments herein, and vice versa.

In embodiments according to any aspect, the apparatus may be or comprise an integrated-circuit device—e.g., a silicon chip. The preamble correlator and signal demodulator may be integrated on a system-on-chip device. The apparatus may comprise any one or more of: a power supply, an antenna, a crystal, discrete capacitors, discrete resistors, etc. The apparatus may comprise a digital radio receiver or transceiver. It may comprise one or more processors, DSPs, logic gates, amplifiers, filters, digital components, analogue components, non-volatile memories (e.g., for storing software instructions), volatile memories, memory buses, peripherals, inputs, outputs, and any other relevant electronic components or features.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
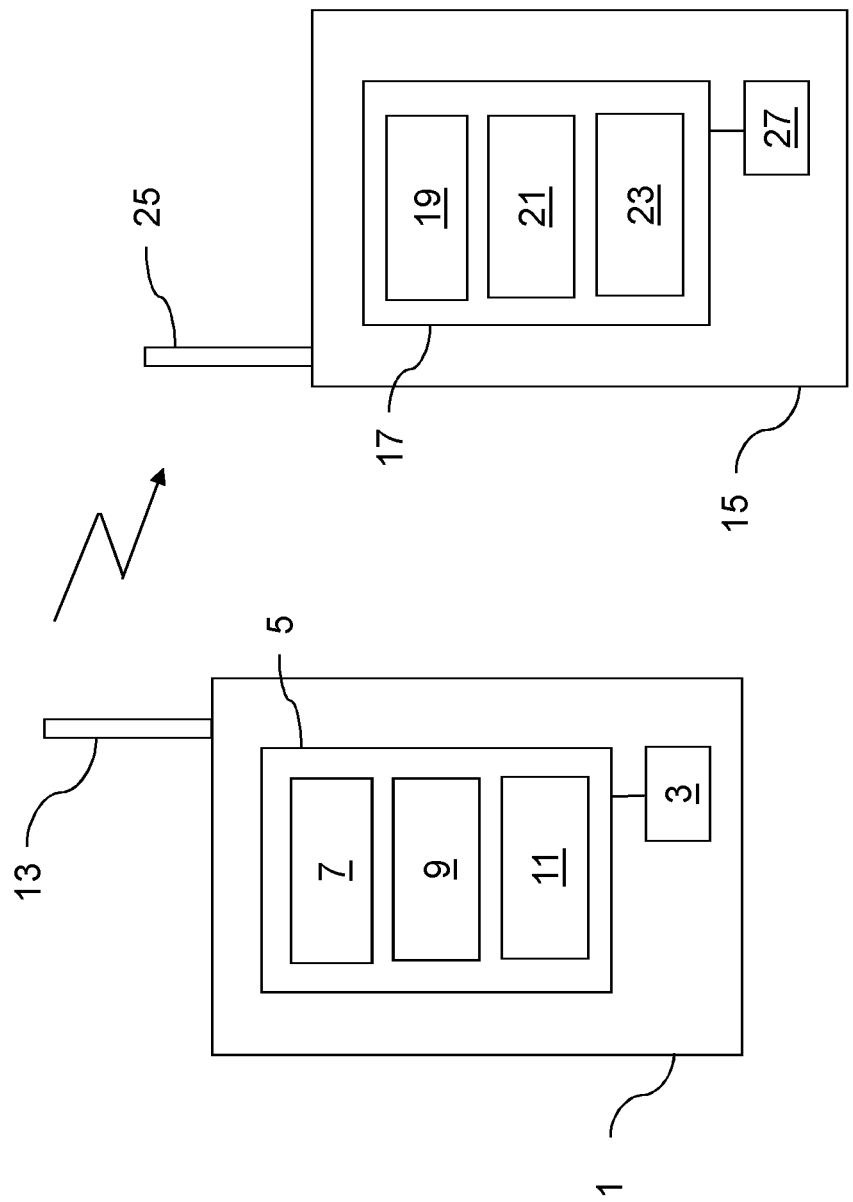
FIG. 1 is a schematic drawing of a radio communication system including a radio receiver embodying the invention.

FIG. 1 shows a radio transmitter device 1 which is in communication with a radio receiver device 15. The radio receiver device 15 embodies the present invention.

The radio transmitter device 1 has a sensor 3 (e.g. a temperature sensor) which is connected to a system-on-chip (SoC) 5. The SoC 5 comprises radio transceiver circuitry 7 and a microprocessor 9, such as an ARM™ Cortex M-series processor, for executing software stored in a memory 11. The device 1 may also contain other components, such as a battery, discrete components, etc., which are omitted from the FIG. 1 for simplicity. The radio transceiver circuitry 7 is connected to a radio antenna 13, for transmitting and receiving radio signals.

The radio receiver device 15 has a system-on-chip (SoC) 17, comprising radio transceiver circuitry 19, a microprocessor 21, such as an ARM™ Cortex M-series processor, and a memory 23 for storing software to be executed by the microprocessor 21. The radio transceiver circuitry 19 is connected to an antenna 25 for receiving and transmitting radio signals. The SoC 17 is connected to an output peripheral 27, such as a display screen, for outputting a response which may be based, at least in part, on data received by the radio transceiver circuitry 19 through the antenna 25. The receiver device 15 may contain other components (not shown), such as a battery, discrete components, further microprocessors, etc.

In use, the radio transmitter device 1 transmits data packets from the antenna 13, modulated on a radio-frequency carrier (e.g. at around 2.4 GHz), using two-level GFSK with a modulation index h. The data packet comprises a predetermined synchronization sequence and a message-data portion. It may also include one or more of address data, a link-layer identifier, packet-length data, and any other appropriate elements. A preamble portion of the packet, for the purposes of the cross-correlations described below, may comprise some or all of the synchronization sequence and/or some or all of the address or link-layer data. The radio receiver device 15 is configured to receive, demodulate and decode such data packets. It may also transmit similar data packets. The data packets may comply with some or all parts of a version of the Bluetooth Low Energy (BLE)™ core specification, e.g. Bluetooth™ 5. The radio receiver device 15 may be a BLE receiver.

The radio transceiver circuitry 19 in the radio receiver device 15 uses a matched filter bank (MFB) to implement non-coherent detection of incoming data. The MFB may observe a number, K, of bits at a time—e.g. using an observation interval that is K=3, 5 or 7 bits long.

The modulation index h is the difference between the two FSK frequencies, divided by the bitrate of the encoded data stream. In order to demodulate a received data packet accurately, the receiver 15 needs to have an accurate estimate of the modulation index used by the transmitter 1. However, the exact modulation index may not be known to the receiver 15. In some situations, the transmitter 1 may be able to use any modulation index within a range of values—e.g. in the range [0.45, 0.55]. The modulation index it uses may also change over time.

If the receiver 15 does not have an accurate estimate h of the actual modulation index h, the sensitivity of the receiver 15 can be reduced. This is because a phase error can accumulate over an observation interval, thereby affecting detector performance. If h is inaccurate by 0.05, for example, this can result in a potential phase offset in the received signal of +/−0.05.K·π, which equals π/4 for K=5.

For a K=5 detector, the performance loss may be of the order of 0.7 dB loss for BLE at 1 Mbps data rate, and may be even greater for some other radio protocols.

Figure 2:
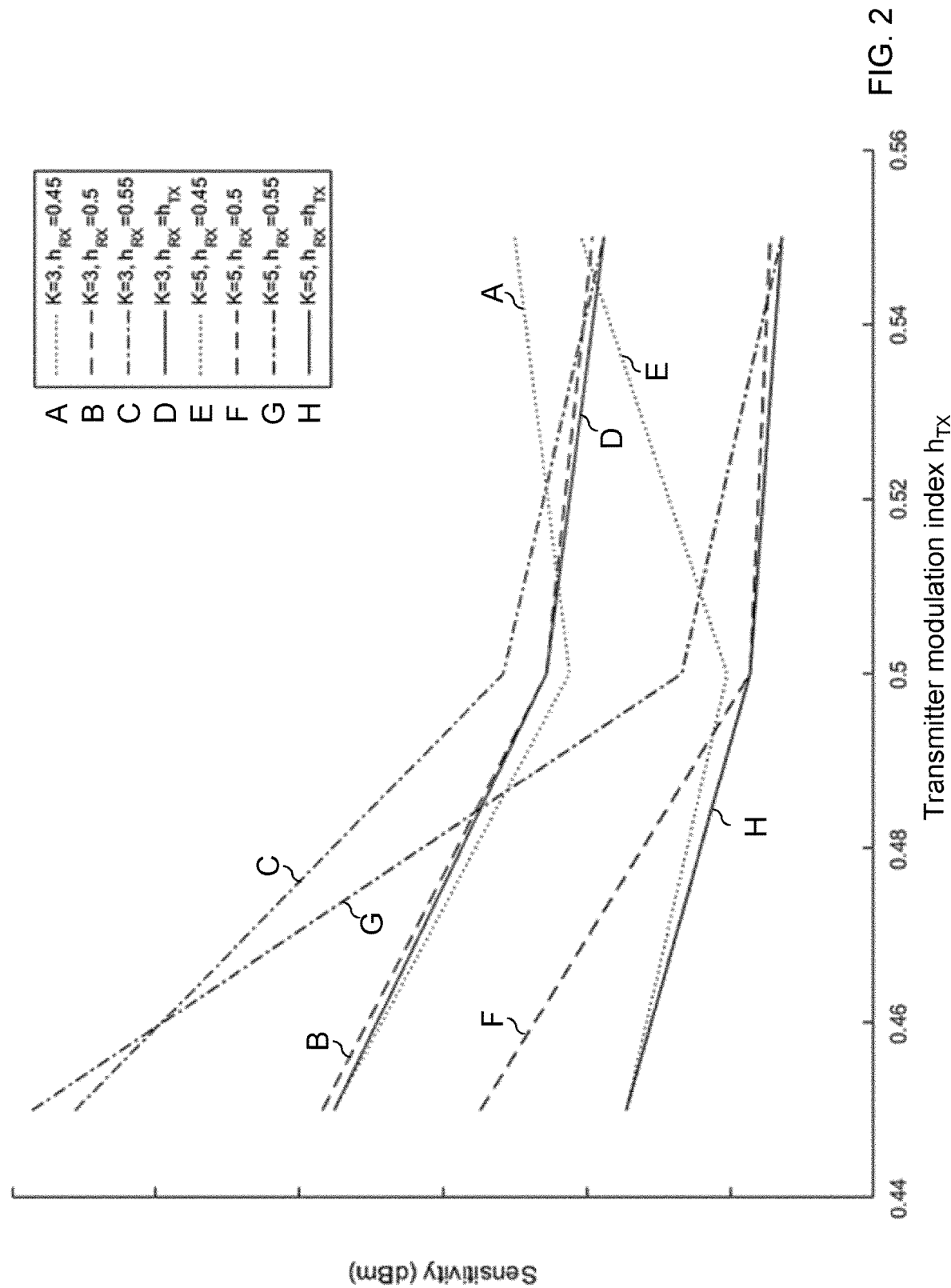
FIG. 2 is a graph of receiver sensitivity against transmitter modulation index in simulated BLE receivers under various degrees of modulation index mismatch or match.

FIG. 2 shows simulation results for a BLE transmitter and receiver under various combinations of transmitter modulation index $h_{TX}$ and receiver estimated modulation index $h_{RX}$, for a K=3 detector and a K=5 detector. Sensitivity is plotted as a linear scale on the vertical axis, against different values of $h_{TX}$ on the horizontal axis. The lines D and H represent an accurate estimate, $h_{RX}$, and exhibit the best sensitivity for their respective observation intervals, whereas lines A, B, C, E, F and G show the effects of different constant $h_{RX}$ values, which will each be an incorrect estimate of $h_{TX}$ at all but one point along the horizontal axis. The graph demonstrates the reduced sensitivity when the estimate is inaccurate.

This problem is mitigated in embodiments described herein, in which a receiver uses a novel approach to estimate the modulation index. The estimated modulation index may then be used to improve the accuracy of the demodulation of the received signal—e.g. by selecting the coefficients in a MFB according to the estimated modulation index.

Figure 3:
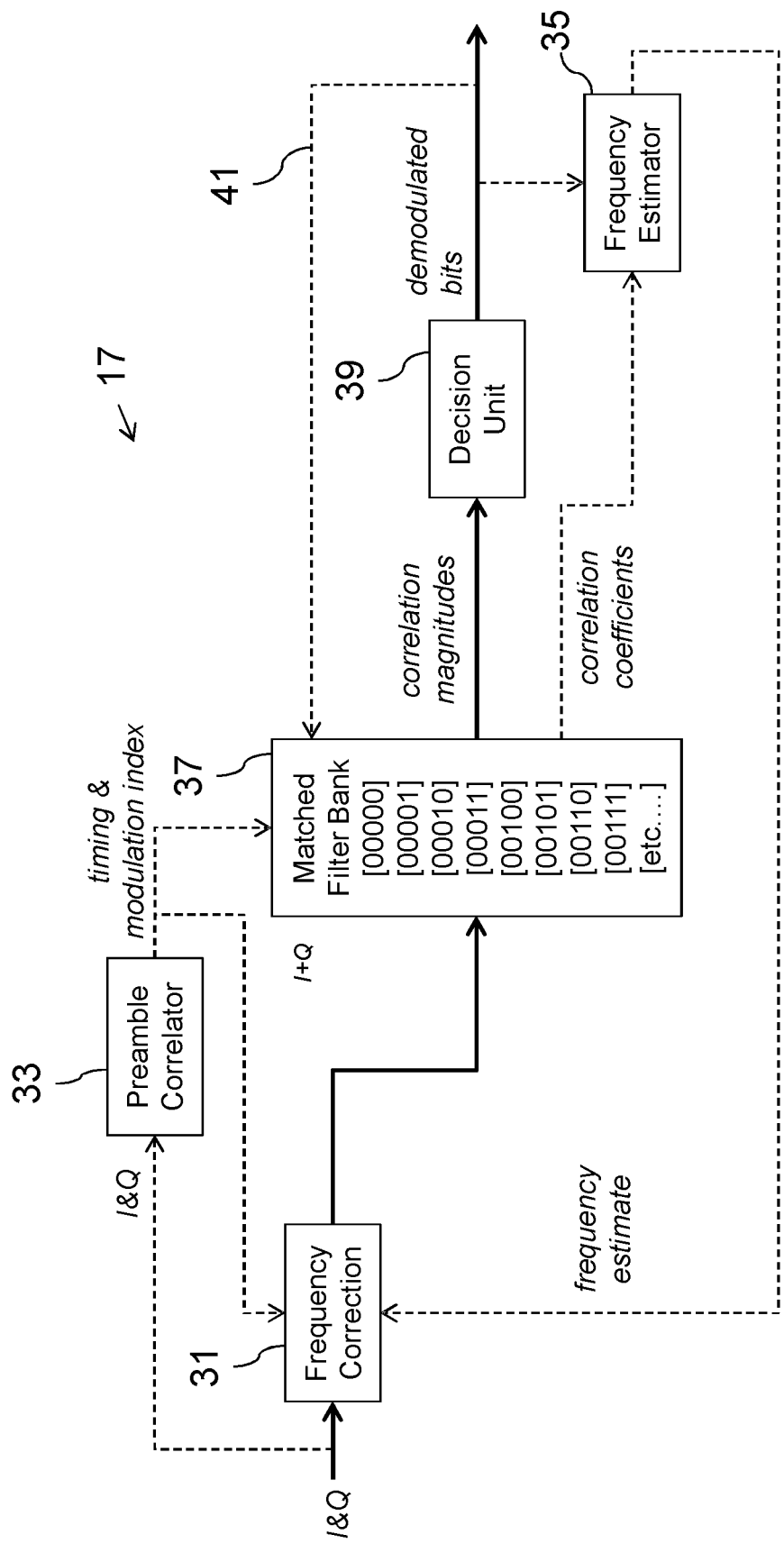
FIG. 3 is a schematic drawing of functional units within the receiver circuitry of the radio receiver of FIG. 1.

FIG. 3 shows functional blocks provided by the system-on-chip (SoC) 17 that are used in demodulating an incoming CP-FSK encoded radio signal. Each of these blocks may be implemented using dedicated circuitry in the radio transceiver circuitry 19—e.g. comprising application-specific registers and logic gates. However, in some embodiments, one or more operations of one or more blocks may be implemented by software, e.g. executing on the microprocessor 21. A pure software implementation is possible, but may be undesirable for performance reasons.

The radio transceiver circuitry 19 may use any combination of amplifiers, mixers, filters, analogue-to-digital converters, etc. to generate a sampled radio signal, from a received analogue radio signal, comprising a sequence of complex-valued digital samples, I & Q, at baseband. These samples represent the radio signals received around a particular carrier frequency—e.g. in a band within the 2.4 GHz spectrum. The signal may be oversampled by a factor R. In some examples, R=8, although it could take any suitable value.

The principal signal path through the components of FIG. 3 is shown using solid arrows, while control and feedback paths are shown using dashed arrows.

The stream of complex baseband samples, I & Q, are input to a frequency correction block 31, which performs complex rotation on the samples to compensate for any carrier-frequency offset, based on frequency-offset information received from a preamble correlator 33 and from a frequency drift estimator 35. The frequency correction block 31 may comprise one or more CORDIC circuits for performing the rotation.

The complex baseband samples are, in parallel, also fed to the preamble correlator 33. This correlator 33 determines an initial frequency offset estimate (e.g. arising from a mismatch between a clock of the receiver 15 and a clock of the transmitter 7). It also determines an estimate of the modulation index, and performs timing recovery and frame synchronization.

The preamble correlator 33 determines these values by cross-correlating the incoming samples against a set of stored templates. The templates are all based on a common fixed preamble bitstream that is encoded by each data packet intended for the receiver 15, but each template is generated using a different assumed modulation index. Each template comprises a sequence of (complex) coefficients that represents the modulated baseband waveform of the preamble.

The preamble may comprise part or all of a constant synchronization sequence that is present in every data packet within the system, and/or part or all of an address of the receiver 15 and/or part or all of a channel or link identifier and/or any other appropriate data. When receiving BLE data packets, the preamble correlator 33 may, for example, use 16-bit preamble sequences, consisting of the last two bits of the BLE Preamble field and the first fourteen bits of the Address field. The preamble used by the correlator may, at least for some packets, precede message data encoded in the data packet.

The preamble correlator 33 is a data-aided joint timing and frequency estimator. It exploits knowledge of the data in the received symbols to cancel the effect of the FSK modulation on the estimate of a delay-and-correlate type of carrier-frequency offset estimator. The principle behind the synchronization used in these embodiments may be as described with reference to the double correlator in WO 2014/167318, by the present applicant, the entire contents of which are hereby incorporated by reference.

In detail, to determine frequency offset and timing, the preamble correlator 33 identifies, for one of the templates, the temporal position of a peak in the correlation coefficient of a cross-correlation (performed every sample) between the incoming sample stream and the template. It may be sufficient to use just one template for frequency offset and timing estimation—e.g. the template generated using a most central modulation index of all the modulation index hypotheses.

More specifically, the carrier frequency offset estimator is given by:

$$\Delta \hat{f} = \frac{1}{2\pi DT} \arg \left\{ \sum_{i=0}^{L-1} [z_{n-i} z^*_{n-i-D}] d_i \right\} \quad (1)$$

where:
L is the correlation length;
D is a delay value (e.g. chosen such that the maximum frequency offset is not breached, i.e. $DT < 1/(2\Delta f)$);
z represents the complex (I & Q) baseband samples;
$d_i = p_i^* p_{i+D}$ where p are the samples of the up-sampled packet synchronization preamble waveform; and
T is the sample rate period.

The correlation length, L, could be 24, 128 or 192, or any other appropriate value. In general the correlation length is a trade-off between estimation accuracy, implementation cost, and the length of the known preamble data (e.g. from a preamble or sync word, such as an access address).

Packet detection is achieved when a peak is detected in equation (2):

$$M_n = \frac{|C_n|}{P_n}, \text{ where} \quad (2)$$

$$C_n = \sum_{i=0}^{L-1} [z_{n-i} z^*_{n-i-D}] d_i \text{ and} \quad (3)$$

$$P_n = \sum_{i=0}^{L-1} |z_{n-i-D}|^2 \quad (4)$$

The sample time of the packet detection peak provides the frame synchronization. The preamble correlator 33 implements operations based on equations (2) to (4) to perform a complex correlation between the complex baseband samples and the template samples. The preamble correlator 33 normalizes (scales) the magnitude of the correlator peak in equation (2) using a measure of signal power, $P_n$, from equation (4). A valid peak in (2) is determined against a configurable threshold. This threshold will typically be set in the range 0.7-0.8.

Equation (1) can be rewritten in polar form as:

$$\Delta \hat{f} = \frac{1}{2\pi DT} \arg \left\{ \sum_{i=0}^{L-1} [z_{n-i} z^*_{n-i-D} p_i^* p_{i+D}] \right\} \quad (5)$$

$$= \frac{1}{2\pi DT} \arg \left\{ \sum_{i=0}^{L-1} [r_{n-i} e^{j(\theta_{n-i} + \varphi_{n-i})} \right.$$

$$\left. r_{n-i-D} e^{-j(\theta_{n-i-D} + \varphi_{n-i-D})} u_i e^{-j\gamma_i} u_{i+D} e^{j\gamma_{i+D}}] \right\}$$

$$= \frac{1}{2\pi DT} \arg \left\{ e^{j\varphi_\Delta} \sum_{i=0}^{L-1} [r_{n-i} e^{j\theta_{n-i}} r_{n-i-D} e^{-j\theta_{n-i-D}} u_i e^{-j\gamma_i} u_{i+D} e^{j\gamma_{i+D}}] \right\}$$

where {r,u} are the magnitudes of the complex numbers. Assuming that the carrier frequency offset is approximately constant, $\varphi_\Delta$ is the change of phase over D samples.

When synchronized (i.e. when equation (2) peaks), the sample angles track the coefficient angles ($\theta_{n-i} \approx \gamma_i$) and equation (5) may be rewritten as:

$$\Delta \hat{f} = \frac{1}{2\pi DT} \arg \left\{ e^{j\varphi_\Delta} \sum_{i=0}^{L-1} [r_{n-i} r_{n-i-D} u_i u_{i+D} e^{j(\theta_{n-i} - \theta_{n-i-D})} \cdot e^{-j(\gamma_i - \gamma_{i+D})}] \right\} \quad (6)$$

$$\approx \frac{1}{2\pi DT} \arg \left\{ e^{j\varphi_\Delta} \sum_{i=0}^{L-1} [r_{n-i} r_{n-i-D} u_i u_{i+D}] \right\} = \frac{\varphi_\Delta}{2\pi DT}$$

If T=125 ns and D=16, the maximum carrier frequency offset that can be estimated (in either direction) is $$\Delta \hat{f}_{max} \approx \frac{1}{2\pi \cdot 16 \cdot 0.125 \cdot 10^{-6}} \cdot \pi = 250 \text{ kHz}$$

The carrier frequency offset estimate is valid when there is high correlation, i.e. when equation (2) peaks. Therefore this estimator jointly estimates carrier frequency offset and timing. Assuming $u_1=1$, the sum in equation (6) effectively evaluates the energy in the L baseband samples at the time of correlation. This value is normalized with a in equation (2) before the preamble correlator 33 compares the (normalized) correlation coefficient with a threshold, e.g. in the range 0.7-0.8. A value of D=16 was chosen in one example, as the corresponding carrier frequency offset estimator range of +/−250 kHz supports a crystal specification of 50 ppm which may be sufficient in many applications, but other values could be used.

By performing timing recovery, frame synchronization and initial frequency offset estimation in one joint operation, the preamble correlator 33 is ideal for situations where synchronization must be performed quickly.

In order to estimate the modulation index, one or more further templates are used.

In some embodiments, the preamble correlator 33 cross-correlates the incoming signal with two or more templates simultaneously (i.e. in parallel).

However, in other embodiments, the cross-correlation operations (e.g. vector dot product calculations) for the different templates are performed at different times (i.e.

serially). Performing the operations serially can allow for a simpler (smaller) hardware implementation of the preamble correlator 33. It also means that the frame synchronization need only be performed on one of the templates (using a full sliding cross-correlation process), while, once frame synchronization has been established, each of the further templates need only be applied once to the buffered incoming samples, aligned with the preamble portion of the data packet. In this way, the preamble correlator 33 can generate a correlation coefficient for each further template by performing a single respective dot product calculation. The preamble correlator 33 may be reconfigured, using the coefficients of the one or more further templates, for each template in turn, once frame synchronization has been successfully achieved.

Performing a further cross-correlation operation with different coefficients loaded in the preamble correlator 33, corresponding to one or more further templates, can also enable further frequency offset estimates to be obtained, which may be combined with the original frequency offset (e.g. by averaging) to obtain a more accurate estimate of the initial frequency offset.

As FIG. 2 indicates, an appreciable performance improvement can be obtained from even a very coarse estimate of the modulation index. For instance, when $h_{TX}$=0.45, it may be possible to halve an expected 0.5 dB loss using even a very approximate estimate $h_{TX}$=0.475. Therefore, an improvement can be realised even if there are only two or three different templates in the set. For example, in some embodiments, just two different templates are used.

After frame synchronization has been attained using a first template, the preamble correlator 33 is reconfigured with the correlation coefficients of the next template. These may be loaded into registers of the preamble correlator 33 from a memory within or outside the preamble correlator 33 (e.g., using DMA). The coefficients will typically be precomputed. A new normalized peak correlation coefficient is determined, based on equation (2) above. If a full cross-correlation is performed (e.g. when applying the templates in parallel), the peak may need to be detected; however, if frame synchronization has already been established, only a single correlation coefficient need be calculated for each further template, which will be at the peak location already.

The preamble correlator 33 compares the normalized peak correlation coefficients across the set of templates to identify the highest. The template having the highest peak determines a modulation index estimate that is output by the preamble correlator 33. The estimated modulation index may equal the modulation index used to generate the template, although this is not necessarily the case. In some embodiments, two templates are used: a first template generated with a modulation index of $h_{TX}$=0.5 (for the free-running cross-correlation), and a second template generated with a modulation index of $h_{TX}$=0.45 (for the alternative template, after frame sync); however, if the first template gives the higher peak, the correlation 33 may output an estimated modulation index of $h_{TX}$=0.5, while, if the second template gives the higher peak, it may output $h_{TX}$=0.475 (rather than 0.45). This can be beneficial because, if there is an error (e.g. due to a noisy channel) and the correlation 33 finds a peak in the second template, when the transmitter's modulation index is actually 0.5, then outputting 0.475 instead of 0.45 does not result in too bad a loss of sensitivity. If the receiver used 0.45 incorrectly, the performance could be far more impaired. This consideration will depend on the particular MFB 37 implementation used, but outputting a different estimate from the modulation index used to generate the best-matched template has been found to be advantageous at least in some receiver designs.

Symbol and frame (i.e. packet) timing information determined by the double correlator 33 are output to the frequency correction block 31. The frequency estimate may need to be relatively accurate (e.g., to within around 10 kHz) in order to avoid significant sensitivity degradation. The frequency correction block 31 applies a complex rotation to the sample stream to compensate it for the estimated carrier frequency offset. The rotation can also take account of real-time drift as the packet is received using the output of the frequency drift estimator 35, described below.

The timing information and the estimated modulation index are also output from the preamble correlator 33 to a matched filter bank (MFB) 37. In addition, the matched filter bank 37 also receives the stream of frequency-corrected samples from the frequency correction block 31. The matched filter bank 37 applies a set of filters, each K bits long. In FIG. 3, K=5, but K could be 3, 4, 7, 11 or any other length. Each filter of the MFB 37 performs a complex cross-correlation between the sampled signal and a respective filter sequence of coefficients that represents a baseband waveform modulated according to a respective bit pattern.

The MFB 37 uses the modulation index estimate, $h_{TX}$, received from the preamble correlator 33 to select between multiple sets of filter sequence coefficients. It may access an internal or external memory in which a plurality of sets of coefficients are stored, one set for each template used by the correlator 33. Alternatively, it could generate appropriate sequence coefficients as required, but this may be more complex and introduce additional latency.

At each sample time step, the matched filter bank 37 generates a set of 2K complex correlation coefficients, one for each filter in the selected set, representing the degree of correlation between a window of the incoming samples and the respective template. The MFB 37 computes a real-valued modulus of each coefficient and outputs these as a set of 2K correlation strength values to a decision unit 39. In some embodiments, the MFB 37 may be implemented similarly to the MFB disclosed in the applicant's earlier application WO 2019/134947, the entire contents of which are hereby incorporated by reference, with the modulation index h set equal to the estimate output by the preamble correlator 33.

The decision unit 39 receives this correlation-strength data and processes it to generate a sequence of decoded bits. This processing may be similar or the same as that described for the decision unit in the applicant's earlier application WO 2019/207009, the entire contents of which are hereby incorporated by reference. In other embodiments, the MFB output may be processed using majority voting principles as disclosed in WO 2014/167318. The decision unit 39 outputs a demodulated bit value at each bit period.

In some embodiments, the decoded bits are fed back to the matched filter bank along a feedback path 41. In such embodiments, these bits may be used by the MFB 37 to help refine the filter sequences that the MFB 37 cross-correlates with the received samples—e.g. as described in WO 2019/207009.

The complex correlation coefficients from the matched filter bank 37 are also sent to the frequency drift estimator 35, which uses them to detect any on-going frequency drift, subsequent to the initial frequency offset estimated by the preamble correlator 33. Such drift, if not corrected for, may negatively impact the performance of the demodulation. Estimates of frequency drift are fed back to the frequency correction block 31.

The demodulated bit stream, output by the decision unit 39, may be stored in the memory 23 and/or may be processed further by the radio receiver 15 or by some other device, as appropriate. It may, in some applications, determine an output from the peripheral 27—e.g. decoded data from a variable message portion of a data packet may control what is displayed on a display screen of the receiver device 15.

Figure 4:
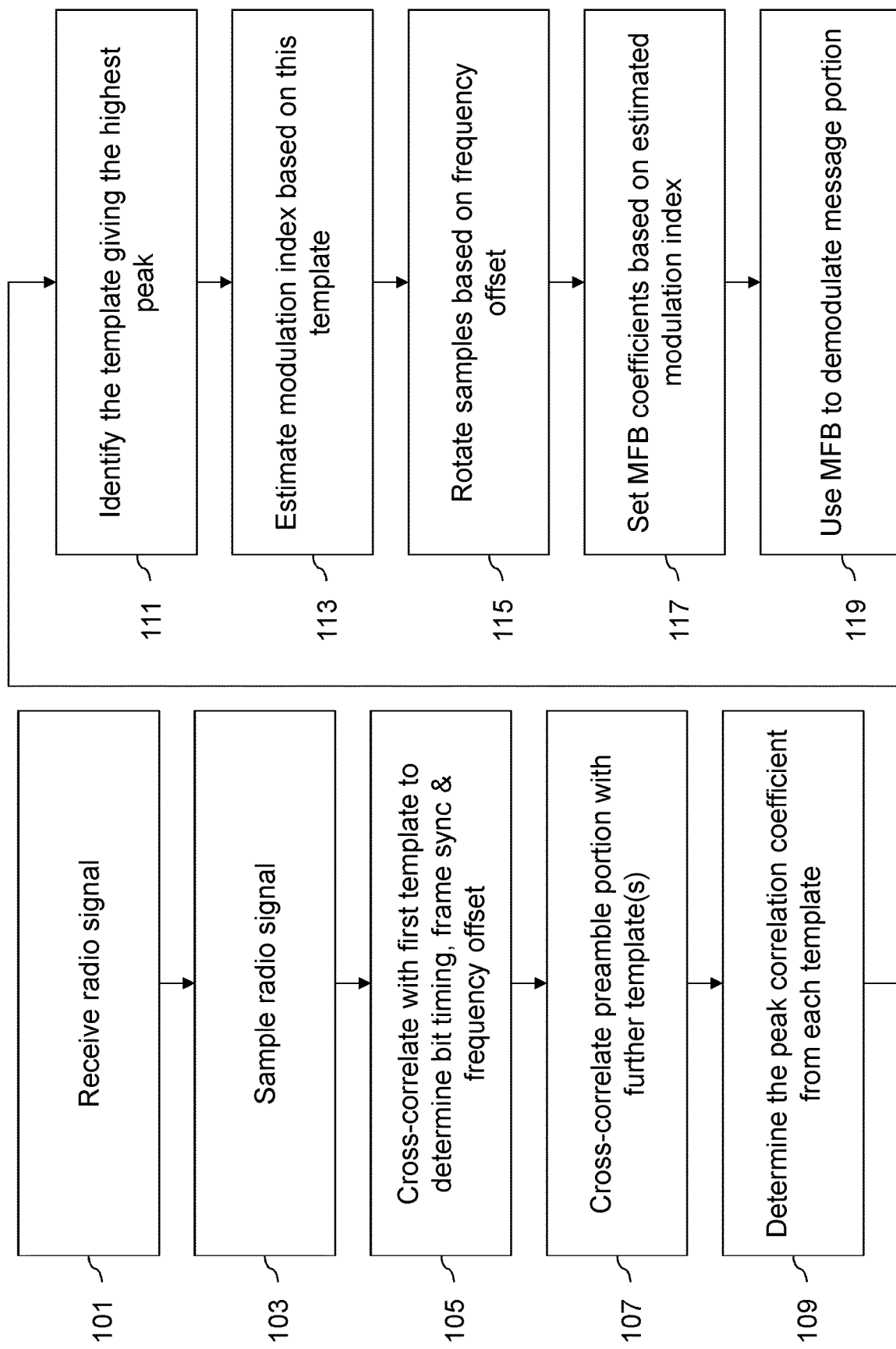
FIG. 4 is a flow chart of operations performed by the receiver circuitry of the radio receiver of FIG. 1.

FIG. 4 summarises some of the key operations, described above, that are performed using the SoC 17.

A physical radio signal is received 101 and sampled 103. The samples are cross-correlated with a first template (e.g. generated with a modulation index of 0.5) to determine bit-level synchronization, frame-level synchronization, and a frequency-offset estimate 105. The frame-level synchronization allows a preamble portion of the received packet to be identified. One or more further templates (e.g. a second template generated with a modulation index of 0.45) are then cross-correlated just with the preamble portion 107. A peak correlation coefficient value is determined for each template 109. The template with the highest peak is identified 111. A modulation index estimate is determined based on the identified best-matched template 113 (e.g. a value of 0.475, if the best-matched template is the second template). The incoming samples are rotated based on the estimated frequency offset to compensate for the frequency offset 115. The matched filter bank (MFB) coefficients are selected in dependence on the modulation index estimate 117. The MFB is used, potentially in conjunction with further decision circuitry 39, to demodulate a message portion of the data packet 119.

Figure 5:
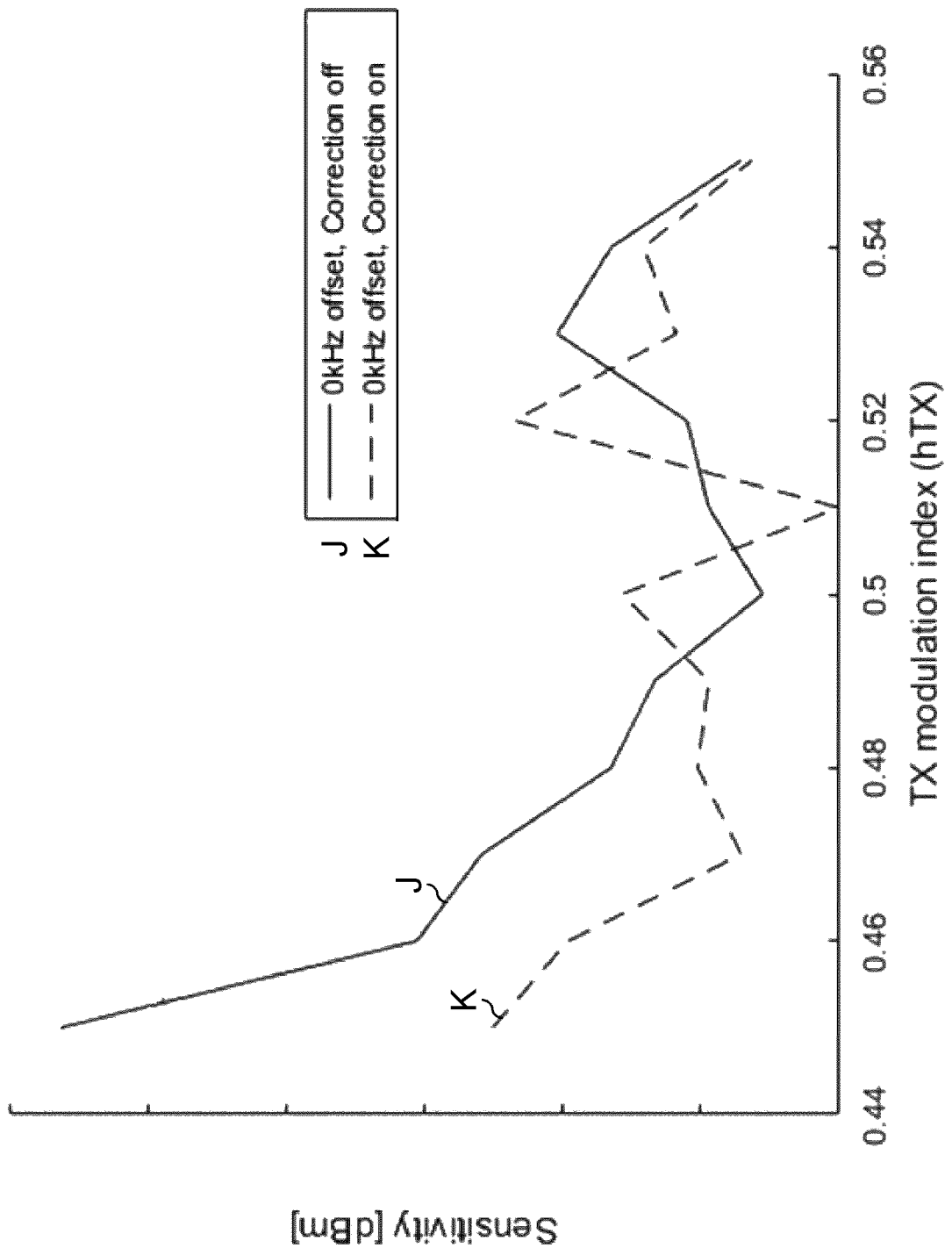
FIG. 5 is a graph of sensitivity against transmitter modulation index in a simulated BLE receiver that embodies the invention compared with a BLE receiver that is not applying modulation-index estimation.

FIG. 5 shows simulation results for BLE radio transceiver circuitry implementing the principles disclosed herein, receiving one hundred packets, with a MFB length K=5, a preamble correlation window length L=24, no frequency offset, and the frequency drift estimator 35 not active. Sensitivity in dBm is shown as a linear scale on the vertical axis. The lines J, K plot sensitivity against different values of transmitter modulation index $h_{TX}$. The solid line J is a baseline comparison in which no modulation index estimation is performed by the receiver. The dashed line K shows the corresponding performance with modulation index estimation active and with the MFB 37 taking account of the estimated modulated index. There is approximately a 0.7 dB of improvement when $h_{TX}$=0.45, and an improvement in sensitivity across the majority of the range [0.45, 0.55] for $h_{TX}$.

Although some of the above disclosure has been described in the context of binary symbols (i.e. bits), it will be appreciated that the same principles can also be applied to systems that use higher-order modulation, such as quadrature modulation, where each symbol may have four or more possible values.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of demodulating a frequency-modulated signal, the method comprising:
    for each of a plurality of templates, performing a respective cross-correlation operation between the template and data representative of the frequency-modulated signal, wherein each template comprises data representative of a signal that is frequency-modulated with predetermined preamble data using a different respective modulation index;
    generating frequency-offset data from one or more of the cross-correlation operations, the frequency-offset data being representative of a difference between a reference frequency and a carrier frequency of the frequency-modulated signal;
    determining a respective peak correlation-coefficient value from each of the cross-correlation operations;
    identifying a highest peak correlation-coefficient value in the determined peak correlation-coefficient values;
    determining a modulation index estimate in dependence on which template produced the highest peak correlation-coefficient value; and
    using the frequency-offset data and the modulation index estimate to demodulate at least a portion of the frequency-modulated signal.

2. The method of claim 1, further comprising generating timing information from one or more of the cross-correlation operations, the timing information comprising symbol-synchronization or frame-synchronization information, and additionally using the timing information when demodulating at least a portion of the frequency-modulated signal.

3. The method of claim 1, comprising:
    performing a first cross-correlation operation between a first template and data representative of the frequency-modulated signal by determining a respective correlation-coefficient value for each of a plurality of different time offsets between the first template and the data representative of the frequency-modulated signal;
    determining timing information from the first cross-correlation operation; and
    performing a second cross-correlation operation between a second template and the data representative of the frequency-modulated signal by determining a correlation-coefficient value for a time offset between the second template and the data representative of the frequency-modulated signal, wherein the time offset depends on the timing information determined from the first cross-correlation operation.

4. The method of claim 3, wherein the frequency-modulated signal contains the predetermined preamble data, and wherein the timing information used by the second cross-correlation operation identifies a position of the predetermined preamble data within the signal.

5. The method of claim 1, wherein the data representative of the frequency-modulated signal comprises a sequence of complex, baseband sample values.

6. The method of claim 1, comprising receiving the frequency-modulated signal, wherein the frequency-modulated signal is a radio signal.

7. The method of claim 1, wherein the frequency-modulated signal is a Gaussian frequency-shift-key (GFSK) modulated signal.

8. The method of claim 1, wherein, for at least one of the templates, performing the respective cross-correlation operation comprises generating one or more correlation-coefficient values that each depend on a respective dot product between the template and a sequence of values derived from the data representative of the frequency-modulated signal, wherein each value depends on the product of a respective first sample from the data representative of the frequency-modulated signal and the complex conjugate of a respective second sample from the data representative of the frequency-modulated signal, wherein each second sample is offset from the respective first sample by an offset period.

9. The method of claim 1, wherein the modulation index estimate is different from the modulation index of the template that produced the highest peak correlation-coefficient value.

10. An apparatus for demodulating a frequency-modulated signal, the apparatus comprising:
a preamble correlator; and
a signal demodulator,
wherein the preamble correlator is configured to:
perform, for each of a plurality of templates, a respective cross-correlation operation between the template and data representative of the frequency-modulated signal, wherein each template comprises data representative of a signal that is frequency-modulated with predetermined preamble data using a different respective modulation index;
generate frequency-offset data from one or more of the cross-correlation operations, the frequency-offset data being representative of a difference between a reference frequency and a carrier frequency of the frequency-modulated signal;
determine a respective peak correlation-coefficient value from each of the cross-correlation operations;
identify a highest peak correlation-coefficient value in the determined peak correlation-coefficient values; and
determine a modulation index estimate in dependence on which template produced the highest peak correlation-coefficient value,
and wherein the signal demodulator is configured to:
use the frequency-offset data and the modulation index estimate to demodulate at least a portion of the frequency-modulated signal.

11. The apparatus of claim 10, wherein the preamble correlator is further configured to generate timing information from one or more of the cross-correlation operations, the timing information comprising symbol-synchronization or frame-synchronization information, wherein the signal demodulator is configured to use the timing information when demodulating at least a portion of the frequency-modulated signal.

12. The apparatus of claim 10, wherein the preamble correlator is configured to:
perform a first cross-correlation operation between a first template and data representative of the frequency-modulated signal by determining a respective correlation-coefficient value for each of a plurality of different time offsets between the first template and the data representative of the frequency-modulated signal;
determine timing information from the first cross-correlation operation; and
perform a second cross-correlation operation between a second template and the data representative of the frequency-modulated signal by determining a correlation-coefficient value for a time offset between the second template and the data representative of the frequency-modulated signal, wherein the time offset depends on the timing information determined from the first cross-correlation operation.

13. The apparatus of claim 12, wherein the timing information using by the second cross-correlation operation identifies a position of the predetermined preamble data within the frequency-modulated signal.

14. The apparatus of claim 10, wherein the preamble correlator is configured to perform the respective cross-correlation operations serially.

15. The apparatus of claim 10, comprising an analogue or digital mixer and a digital-to-analogue converter for sampling the frequency-modulated to generate the data representative of the frequency-modulated signal, wherein the data comprises a sequence of complex, baseband sample values.

16. The apparatus of claim 10, comprising a radio receiver and an antenna for receiving the frequency-modulated signal, wherein the frequency-modulated signal is a radio signal.

17. The apparatus of claim 10, wherein the preamble correlator is configured, for at least one of the templates, to perform the respective cross-correlation operation by generating one or more correlation-coefficient values that each depend on a dot product between the template and a respective sequence of values derived from the data representative of the frequency-modulated signal, wherein each value of the respective sequence of values depends on the product of a respective first sample from the data representative of the frequency-modulated signal and the complex conjugate of a respective second sample from the data representative of the frequency-modulated signal, wherein each second sample is offset from the respective first sample by an offset period.

18. The apparatus of claim 10, wherein the preamble correlator is configured to determine a modulation index estimate that, for at least a set of one or more of the templates, is different from the modulation index of the template that produced the highest peak correlation-coefficient value when the template that produced the highest peak correlation-coefficient value is in said set.

19. The apparatus of claim 10, wherein the signal demodulator comprises a matched filter bank for demodulating at least a portion of the frequency-modulated signal, wherein the matched filter bank is distinct from the preamble correlator, and wherein the signal demodulator is configured to control sets of filter coefficients in the matched filter bank in dependence on the modulation index estimate determined by the preamble correlator.

20. The apparatus of claim 10, wherein the signal demodulator comprises a frequency-correction circuit configured to receive the frequency-offset data from the preamble correlator and configured to apply a rotation operation to at least a portion of the data representative of the frequency-modulated signal, wherein the rotation depends, at least in part, on the received frequency-offset data.

* * * * *